Nov. 5, 1940.                    P. RAVIGNEAUX                    2,220,174
                              SPEED CHANGING DEVICE
                               Filed Aug. 22, 1936

Pol Ravigneaux
INVENTOR his ATTY.

Patented Nov. 5, 1940

2,220,174

UNITED STATES PATENT OFFICE 2,220,174

SPEED CHANGING DEVICE

Pol Ravigneaux, Neuilly-sur-Seine, France

Application August 22, 1936, Serial No. 97,377
In France August 27, 1935

13 Claims. (Cl. 74—268)

The present invention relates to speed changing devices for motor vehicles or any other mechanism.

One object of the invention is to provide a speed changing device embodying a smaller number of pinions than any other speed changing device known heretofore.

Another object is to provide a speed changing device affording the most suitable arrangement of speed ratios for the transmission of the energy of a vehicle engine to the driving wheels thereof.

A still further object is to provide a speed changing device wherein all forward speeds are obtained without disconnecting the gear members which are connected with the driving shaft and the driven shaft from the respective shafts, the change of speed being simply provided by locking intermediate members of said gear by means of non-rotary brakes.

A still further object is to devise a speed changing device comprising two epicycloidal gears, each of which being so constructed that the first and last member thereof rotate in contrary directions (negative speed ratio) when the member supporting the planetary pinions is locked against rotation, said epicycloidal gears having five concentric rotary members only for a speed box affording four speed ratios in forward drive.

A still further object is to provide a speed changing device wherein the parts are so arranged that the members to be held stationary can be reached when the driven shaft is in line with the driving shaft; this condition is necessary for a considerable number of uses, and chiefly for motor car frames in which the engine is in front and the driving wheels in the rear.

In the accompanying drawing, which is given by way of example:

Figure 4:
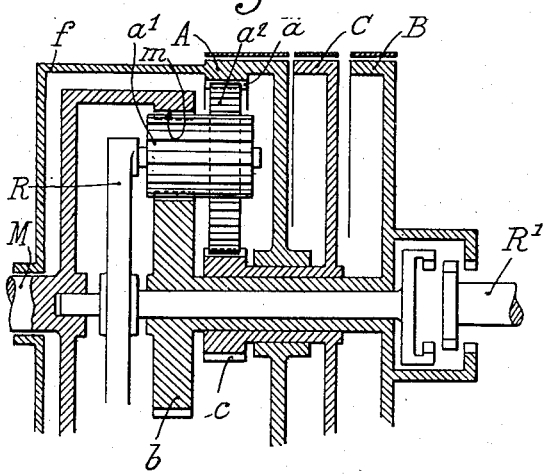
Fig. 4 is a partial longitudinal section of a modification affording two reduced speeds, one on direct drive, one at an increased ratio and one on back drive.
Figure 5:
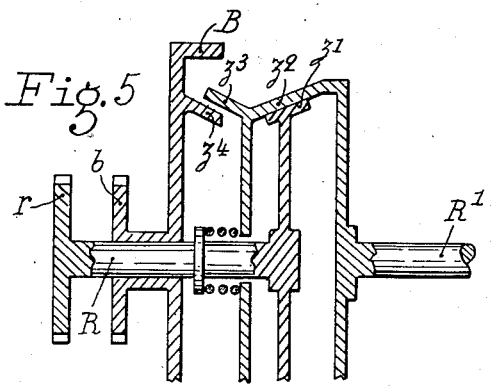

Fig. 5, corresponding to Fig. 4, shows the connections to be made in order to obtain the back drive by a change of the driven part.

In the following examples, a single set of planetary pinions, only represented in the drawing, will be mentioned but, obviously, for the balancing of the masses and forces, several sets of suitably arranged pinions may be provided.

Figure 1:
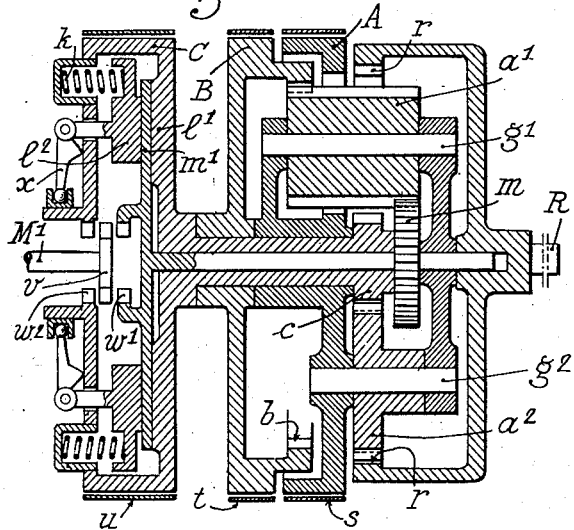
Figs. 1 and 2 are respectively a longitudinal section (on $x\ o\ y$ Fig. 2) and a diagram relating to an embodiment using spur gears, with internal tooth rings, in the case in which the rotation is to be transmitted to a shaft which is in line with the driving shaft.
Figure 3:
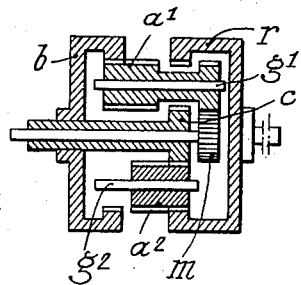
Fig. 3 shows a modification of Fig. 1, in which the central wheels and the planetary pinions have the same diameter two by two.
Figure 2:
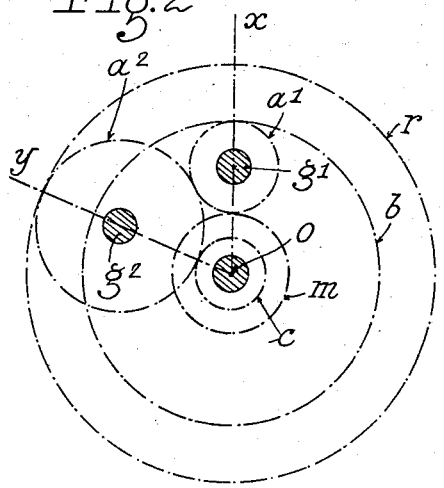

Figs. 1 to 3 relate to a speed changing device providing for four speeds, of which three speeds have a reduced ratio, and eventually a direct drive and back drive.

It comprises two epicycloidal gear sets with spur gears, each gear set having three wheels, i. e., a central wheel $m$ or $c$ with external teeth, a planetary pinion $a^1$ or $a^2$ with single teeth, and an internal tooth wheel $b$ or $r$, making six wheels in all. The four wheels $m\ c\ b\ r$ are coaxial, as well as the support A of the axles $g^1\ g^2$ of the planetary pinions $a^1\ a^2$. This device forms the five parts of a complex epicycloidal gear set.

It should be noted that the two gear sets are such that the support A being fixed, the coaxial gear wheels of the same gear set have speeds in the contrary direction, i. e., the gear set has a negative geometrical ratio.

One of the planetary pinions (for instance $a^1$) has a sufficient length to engage the planetary pinion $a^2$ of the other gear set.

The first set of the mechanism shown in Fig. 1 comprises a central wheel $m$, a planetary pinion $a^1$ mounted on an axle $g^1$ pertaining to the support A, which can be held stationary in order to obtain the first speed, and an internal tooth ring $b$ which can be held stationary in order to obtain the second speed.

The second epicycloidal set comprises a central wheel $c$ secured to the part C which can be held stationary in order to provide the third speed, a planetary pinion $a^2$ rotating on a shaft $g^2$ secured to the support A, and a ring $r$ serving as the driven device.

The planetary pinion $a^1$ has a sufficient length to engage, on the one hand, with the central wheel $m$ and the ring $b$, and on the other hand, with the planetary pinion $a^2$.

In the construction shown in Fig. 1, the wheel $m$ is situated on the side farthest from the motor with reference to the wheel $c$.

On the other hand, owing to a particular arrangement of the planetary pining $a^1$ which permits of transferring its engagement with the internal tooth ring $b$ to the side next the motor, the driven shaft R, secured to the ring $r$, can now be placed in line with the driving shaft.

This arrangement of the planetary pinion $a^1$ which, in order to connect the wheels $m$ and $b$, passes by the teeth of the wheel $c$ and of the wheel $r$ without touching these, is one of the essential features of the invention, in the case in which it is desired to transmit three reduced speeds.

In order to obtain the back drive, various methods can be used, and in particular, one can change the part of the set which receives the driving torque. If the driving part $M^1$ is connected with the member C by the claws $v\ w^2$ instead of connecting it with the part M by the claws $v\ w^1$, this will afford, by holding stationary the part A, a back drive the reduction ratio of which will be $(-0.24)$.

It will be noted that in this mechanical device which provides for three reduced speeds and direct drive, in the case in which the driven shaft is in line with the driving shaft, the gearing will occupy, in all, three widths of wheels, and six gear wheels will suffice for all the combinations.

In order to provide for certain speed ratios, it may be necessary to use a planetary pining $a^1$ whose diameter is too great to allow it to pass between the wheels $c$ and $r$ without touching them, and in this case it is possible, while still remaining within the limits of the invention, to double this planetary pinion, for instance by cutting it as shown in Fig. 3.

In this figure, the central wheels and the planetary pinions are made equal in pairs, and this affords, for rings having for instance four times as many teeth as the central wheels, the reduction ratios $(\div 0.25)\ (\div 0.40)\ (\div 0.625)$.

By making $c$ a driving part and by holding stationary the axles $g^1$ and $g^2$ this will afford a back drive with a reduction of $(-0.25)$.

The frame carrying the axles of the planetary pinions has not been represented.

Fig. 4 shows another modification, in which the device again comprises the two epicycloidal gear sets, having negative geometrical ratios, each of which comprises a central gear wheel with external teeth, $b$ or $c$, an internal tooth ring ($m$ or $a$) and a planetary pinion ($a^1$ or $a^2$), the planetary pinions with single teeth being mounted on the same frame R and being in gear engagement with each other as shown by the diagram, Fig. 2. In order to obtain two speeds at reduced ratios, a third on direct drive, and one at increased ratio, the connections for the driving shaft and the driven shaft are made in a different manner from what is shown in Fig. 1. The driving shaft is connected with the internal tooth ring $m$, and the driven shaft R' is secured to the support R for all forward speeds, and for the speeds on back drive, it is secured to one of the central wheels ($b$).

The internal tooth ring $a$, the one that is not connected to the driving shaft, constitutes the part which is to be held stationary in order to obtain the first speed. The second speed is obtained by holding the central wheel $b$, and the fourth by holding the third central wheel $c$ which is smaller.

A, B, C, indicate the parts to be held stationary for the three speeds which are not direct, starting from the slowest.

It should be noted that this device comprises only two widths of gearing.

By giving to the wheels the following numbers of teeth, which are chosen by way of example:

$m = 72$ teeth
R frame
$a = 88$ teeth
$b = 42$ teeth
$c = 22$ teeth
$a^1 = 15$ teeth
$a^2 = 33$ teeth the speeds given below will be obtained; the first column gives the speed ratios of the driven shaft to the driving shaft, and the second, the ratio of the given speed of the driven shaft to the speed which it has at the fourth speed, the one which is increased.

| | | |
|---|---|---|
| 1st speed | 0.45 | 0.313 |
| 2nd speed | 0.632 | 0.44 |
| 3rd speed | 1. | 0.695 |
| 4th speed | 1.44 | 1. |

If the back drive is obtained by using $b$ as a driven part, and by holding $a$, the following ratios are obtained:

Back drive $(-0.495\ (-0.344)$

Fifth speed: It should be noted that it is possible, without adding a single piece to the mechanism represented, to obtain a fifth speed by making the part $b$ a driven part, as for the back drive, but the part $c$ being braked.

The speed ratios to be added to the list are as follows 2.2  1.53

It should be observed that in the case of Fig. 4, it is quite feasible, as shown at $f$, to place all the gear wheels in a casing in which they will be protected against metallic particles which may result from the braking, and on the other hand, to permit employing braking means which operate in the dry state.

Fig. 5 shows a modified form employed for the back drive in the embodiment of Fig. 4.

The receiving shaft $R^1$, which is normally coupled to the wheel R by claws or by a friction clutch (for instance the cones $z^1\ z^2$), may be separated from the same, and may be coupled to the wheel $b$, for instance by means of cones $z^3\ z^4$.

Obviously, the said invention is not limited to the embodiments herein described and represented, which are given solely by way of example.

Thus it is feasible to employ indiscriminately and without departing from the limits of the invention, all methods for the securing or the holding of the parts, such as clutching and braking of the disc type clutching and braking of the magnetic type, or with expanding segments.

The use of a tappet might be preceded, in order to connect two parts together, or to stop one of these, by a friction device acting after the manner of the "synchromesh" of speed changing boxes.

An arm provided with a tappet may for instance carry a brake shoe mounted on the same in an elastic manner and causing the slowing or the stopping of a drum before the tappet comes into action.

In the following claims, when it is stated that the driven shaft is in axial alignment with the driving shaft, it is meant thereby that said driven shaft is located in line with the driving shaft and that both shafts could be made solid throughout without affecting the operating functions of the assembly.

Having now described my invention what I claim as new and desire to secure by Letters Patent is:

1. A change speed gear comprising in combination a driving shaft and a driven shaft in axial alignment, a planetary assembly comprising five concentric members, that is two sun wheels, two annuli and a pinion carrier, and two satellite pinions meshing with each other and rotatably mounted on said pinion carrier, one of said pinions meshing with one sun wheel and one annulus and the other pinion meshing with the other sun wheel and the other annulus, one train consisting of one sun wheel, one annulus and the pinion meshing with said sun wheel and annulus having one at least of said three elements of a diameter different from the diameter of the corresponding element of the other train, two of said coaxial members being locked in rotation with said driving shaft and said driven shaft respectively, whereas the others are loose on their axis, and means adapted to selectively lock against rotation one of said three loose coaxial members.

2. A change speed gear according to claim 1, further comprising means adapted to lock together two rotary members for direct drive.

3. A change speed gear realising at least one reduced forward speed and one reduced reverse speed comprising in combination a driving shaft, a driven shaft, a planetary assembly comprising five concentric members, that is two sun wheels, two annuli and a pinion carrier, and two satellite pinions meshing with each other and rotatably mounted on said pinion carrier, one of said pinions meshing with one sun wheel and one annulus and the other pinion meshing with the other sun wheel and the other annulus, and one of said coaxial members being secured to one of said shafts, clutching means adapted to connect the other of said shafts with any one of two coaxial members not secured to said one of said shafts, and means adapted to selectively lock against rotation one of the coaxial members not secured to either one of said shafts in such manner as to obtain in one position of said clutching means a reverse drive and in the other position at least one forward drive.

4. A change speed gear according to claim 3 further comprising means adapted to lock together two rotary members for direct drive.

5. A change speed gear comprising in combination a driving shaft, a driven shaft, a planetary assembly comprising five concentric members, that is two sun wheels, two annuli and a pinion carrier, and two satellite pinions meshing with each other and rotatably mounted on said pinion carrier, one of said pinions meshing with one sun wheel and one annulus and the other pinion meshing with the other sun wheel and the other annulus, and at least one of the satellite pinions of one train extending between and clearing the sun wheel and the annulus of the opposite train.

6. A change speed gear comprising in combination a driving shaft, a driven shaft, a planetary assembly comprising five concentric members, that is two sun wheels, two annuli and a pinion carrier, and two satellite pinions meshing with each other and rotatably mounted on said pinion carrier, one of said pinions meshing with one sun wheel and one annulus and the other pinion meshing with the other sun wheel and the other annulus, the sun wheel and the annulus of one train being respectively on opposite sides of the sun wheel and the annulus of the other train.

7. A change speed gear comprising in combination a driving shaft, a driven shaft, a planetary assembly comprising five econcentric members, that is two sun wheels, two annuli and a pinion carrier, and two satellite pinions meshing with each other and rotatably mounted on said pinion carrier, one of said pinions meshing with one sun wheel and one annulus and the other pinion meshing with the other sun wheel and the other annulus, and the planetary pinion extending between the sun wheel and the annulus of one train having between two parts of the same gear surface a reduced diameter small enough to clear the teeth of the sun gear and of the annulus of the other train.

8. A change speed gear comprising in combination a driving shaft, a driven shaft, a planetary assembly comprising five concentric members, that is two sun wheels, two annuli and a pinion carrier, and two satellite pinions meshing with each other and rotatably mounted on said pinion carrier, one of said pinions meshing with one sun wheel and one annulus and the other pinion meshing with the other sun wheel and the other annulus, one of said shafts being locked in rotation with one of said coaxial members, means for selectively connecting in rotation the other of said shafts with any one of two others of said concentric members, means adapted to selectively lock against rotation one of the coaxial members not secured to either one of said shafts, the numbers of teeth of the different wheels being selected in such manner as to obtain four forward speed ratios, including direct drive, and at least one reduced reverse speed.

9. A change speed gear comprising in combination a driving shaft, a driven shaft, a planetary assembly comprising five concentric members, that is two sun wheels, two annuli and a pinion carrier, and two satellite pinions meshing with each other and rotatably mounted on said pinion carrier, one of said pinions meshing with one sun wheel and one annulus and the other pinion meshing with the other sun wheel and the other annulus, one of said shafts being locked in rotation with one of said coaxial members, means for selectively connecting in rotation the other of said shafts with any one of two others of said concentric members, means adapted to selectively lock against rotation one of the coaxial members not secured to either one of said shafts, the numbers of teeth of the different wheels being selected in such manner as to obtain at least two reduced forward speeds, one direct drive, one overdrive and at least one reduced reverse speed.

10. A speed changing device affording at least four speeds in forward drive and one reduced reverse speed comprising in combination a driving shaft, a driven shaft, and two epicycloidal trains connecting said shafts together and comprising for each train one externally toothed sun gear, one internally toothed annulus and a single planetary pinion, the planetary pinion of one train being in constant mesh with the planetary pinion of the other train, a common rotary support for said planetary pinions, said sun gears, annuli and rotary support forming five rotary members concentric with each other, the sun wheel of the first train being on one side of the sun wheel of the second train, and the annulus of said first train being on the other side of the annulus of said second train, the planetary pinion of said first train extending between the sun wheel and the annulus of said second train and having at least locally such a small diameter as to clear the toothings of the sun gear and annulus of said second train, and the annulus of said second train being constantly locked in rotation with said driven shaft, means adapted to selectively lock against rotation the common support, the annulus of said first train and the sun wheel of said second train, clutching means adapted to connect said driving shaft selectively with the sun wheel of said second train for reverse drive, the common support being then locked against rotation, and with the sun wheel of said first train for forward drive, the common support, the annulus of said first train and the sun wheel of said second train being locked against rotation respectively for the first, second and third forward reduced speeds, and means for locking together said two sun wheels for direct drive.

11. A speed changing device affording two reduced speeds, a direct drive and an amplified top speed in forward drive, comprising in combination a driving shaft, a driven shaft and two epicycloidal trains arranged side by side, the first of said trains comprising an annulus locked in rotation with said driving shaft, a loose sun wheel and a planetary pinion, and the second train comprising a loose annulus, a loose sun wheel and a planetary pinion meshing with the planetary pinion of the first train, a common rotary support for said planetary pinions locked in rotation with said driven shaft, means for selectively locking either of said sun wheels and said loose annulus against rotation, and means for locking together two of the rotary members of said device for direct drive.

12. A speed changing device as claimed in claim 11 further comprising means for disconnecting said rotary support from said driven shaft and means for connecting the latter with one of said sun wheels, for reverse speed.

13. A change speed gear comprising in combination a driving shaft, a driven shaft, a planetary assembly comprising five concentric members, that is two sun wheels, two annuli and a pinion carrier, and two satellite pinions meshing with each other and rotatably mounted on said pinion carrier, one of said pinions meshing with one sun wheel and one annulus and the other pinion meshing with the other sun wheel and the other annulus, one of said shafts being locked in rotation with one of said sun wheels and annuli, means for selectively connecting in rotation the other of said shafts with any one of two others of said sun wheels and annuli, and means adapted to selectively resist the motion of one of the three coaxial members not secured to either one of said shafts, the resisting means of the pinion carrier including a flange extending between the two annuli.

POL RAVIGNEAUX.